March 12, 1957   G. M. MEISEL ET AL   2,785,024
LEAK-PROOF SPINDLE BEARING
Filed Jan. 5, 1955
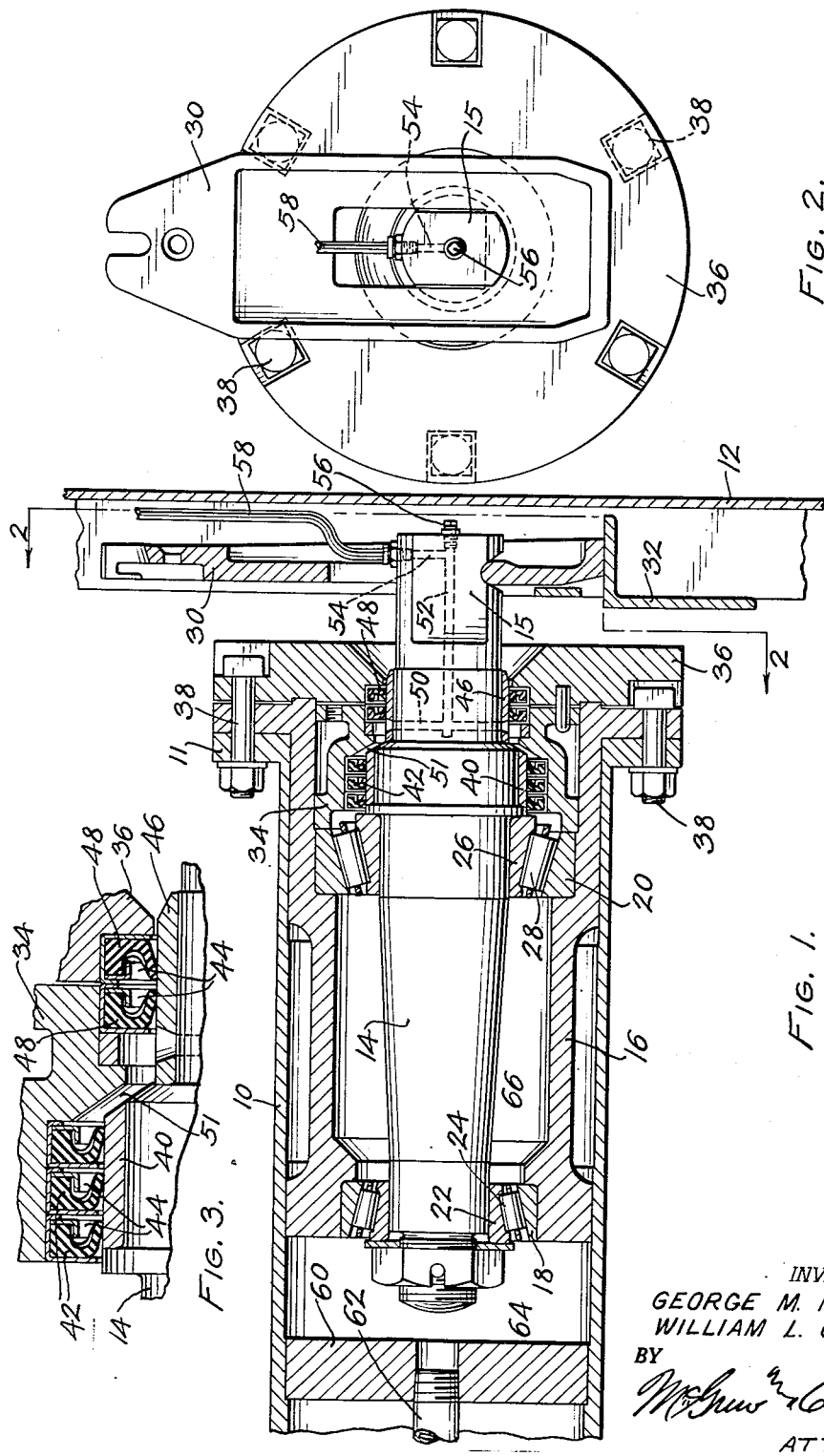
INVENTORS
GEORGE M. MEISEL
WILLIAM L. CHRONIC
BY
McGrew & Edwards
ATTORNEYS

United States Patent Office 2,785,024
Patented Mar. 12, 1957

2,785,024

LEAK-PROOF SPINDLE BEARING

George M. Meisel, Denver, and William L. Chronic, Boulder, Colo., assignors to Colorado Iron Works Company, a corporation of Maine Application January 5, 1955, Serial No. 480,052

6 Claims. (Cl. 308—187.1)

This invention relates to bearing assemblies for submersible members, and more particularly to a leak-proof bearing assembly for metallurgical classifiers and the like, where a rotary bearing is submerged in a pool of an ore pulp.

Many different types of bearings have been previously proposed for submerged operation in classifiers and similar equipment. The present invention provides an improvement in bearing assemblies for such equipment, and provides a substantially leak-proof assembly for preventing inflow of material from the pool into the bearing and outflow leaking from the bearing into the pool. The invention is closely related to copending application, Serial No. 171,464, filed June 30, 1950, for Bearing Assembly for Rotary Machine Elements, now Patent No. 2,701,742, issued February 8, 1955, wherein the bearing assembly disclosed is intended primarily for use in spiral flight ore classifiers.

Included among the objects and advantages of the present invention is a novel bearing assembly which provides means for preventing pollution of a liquid pool in which a rotary shaft is operating, and, also, prevents contamination of bearing lubricant with grit and abrasive and corrosive material from the pool. The bearing assembly is simply and economically constructed, and means are provided for efficiently lubricating the bearings. A novel seal and means for venting bearing lubricant therefrom is provided to maintain the shaft bearings and the bearing lubricants from contact with the pool. Means are, also, provided for maintaining the bearing lubricant under a controlled pressure greater than the hydrostatic head of the pool in which the bearing is submerged.

These and other objects and advantages may be readily ascertained by referring to the following description and appended drawings, in which:

Fig. 1 is a cross-sectional elevation in partial section of bearing assembly according to the invention;

Fig. 2 is an end elevation of the bearing assembly illustrated in Fig. 1; and

Fig. 3 is an enlarged detail of the sealing assembly between the shaft bearing assembly and a pool in which the shaft operates.

In general, the bearing assembly of the invention provides an improved structure for submerged operation where contamination of the submerging pool is to be prevented, as well as preventing contamination of the lubricant for the bearings. The assembly includes a stationary stub shaft and a main shaft telescoping therewith. Rotary bearings are provided between the two shafts so as to provide free rotation therebetween, and a sealing assembly maintains the bearings enclosed within the main shaft out of contact with the pool of pulp. The sealing assembly includes spaced apart rotary sealing members between the carrier and the internal shaft. A passage extends from the space between the two members to a point near the end of the internal shaft. A conduit communicating with the passage extends above the pool level. Lubricant for the bearings is provided through a central grease pipe extending throughout the length of the main shaft. The lubricant is introduced under pressure into the bearing assembly, and excess lubricant escapes out the conduit extending above the pool level. This conduit, also, provides a stand pipe which provides automatic means for keeping the lubricant under a pressure greater than the hydrostatic head of the pool, i. e., the height of the lubricant in the stand pipe determines the pressure of the lubricant in the bearing.

Referring in more detail to the drawings, the drawings illustrate the bearing assembly of the end of the main shaft 10 which is adapted for submerged operation in a pool of ore pulp, or similar fluid. A spiral flight conveyor is the typical type of mechanism which is secured to the rotary shaft for operation in the pool of pulp. The shaft 10 is adapted to be suspended in a tank, a portion of the wall 12 of which is shown. A stub shaft 14 telescopes into the main shaft 10. A carrier member 16, which is mounted between the stub shaft 14 and the main shaft 10, supports outer bearing race 18 adjacent the inner end of the stub shaft 14 and outer bearing race 20 adjacent the end of the main shaft 10. An inner race 22 mounted on the end of the stub shaft is juxtaposed with the outer race 18 and a series of bearing rollers 24 are secured therebetween. An inner race 26, mounted on the stub shaft 14, is juxtaposed with outer race 20 to support a series of bearing rollers 28 therebetween. The stub shaft 14 is the stationary support of the assembly, and the outer end of the stub shaft 15 is mounted on a hanger assembly 30, by which the main shaft is raised and lowered in the pool. The hanger 30 is adapted for resting on a support 32 adjacent the wall 12 for substantially determining the position of the shaft in the tank. A retainer 34 telescopes internally of the carrier 16 abutting outer race 20, and is maintained in position by means of an end plate 36 bolted to a flange 11 on the end of the main shaft by means of bolt and nut assemblies 38. A wear sleeve 40 is mounted on the stub shaft at a point beyond the outer bearing assembly. A series of seals 42 are provided between the retainer and the wear sleeve 40. The seals 42 are annular seals, each of which has a series of annular retaining springs 44 in one face thereof. A second wear sleeve 46 is mounted on the stub shaft between the wear sleeve 40 and the end 15 of the stub shaft. Another set of seals 48 is positioned on the wear sleeve 46. The seals 48 are similar to the seals 42, except that one seal is inverted or reverse in relation to so as to have the two retaining springs 44 facing and abutting one another. A radial passage 50 interconnects with space 51 between the seal 42 and the seal 48 and the retainer and the stub shaft. The passage 50 is interconnected with a passage 52 extending axially along the stub shaft. A radial passage 54 extends from the periphery of the stub shaft to the axial bore 52 and provides communication means with the bore 52. A plug 56 closes the passage 52 on the end of the stub shaft. A flexible vent pipe 58 is interconnected with the passage 54 and the upper end extends above the level of the pool of pulp in the tank. Bearing lubricant may escape through the flexible vent pipe through the passages in the stub shaft from the space between the two seals 42 and 48. The bearing lubricant is maintained under a pressure equal to the head of lubricant in the vent pipe so that the seal 48 may be maintained under a pressure higher than the pressure from the head of the pool and thereby prevent entrance of material from the pool.

A sealing disc 60 internal of the main shaft 10 substantially seals off the end of the main shaft. A grease pipe 62, which extends through the main shaft 10 from the opposite end thereof is secured by a threaded connection into the sealing disc 60. Lubricant for the bearings is forced under pressure through the grease pipe 62 into space 64 between the stub shaft and the sealing disc 60. The bearings 24 are substantially open to the space 64 so as to permit lubricant to pass between the bearings into a space 66 between the stub shaft and the carrier 16. The bearings 28 are, likewise, substantially open to space 66 so that lubricant will enter the bearing race. The end seals 48 prevent bearing lubricants from passing beyond the wear sleeve 46. As bearing lubricant is forced under pressure into space 51, and subsequently escapes through vent pipe 58, the bearing lubricant may be prevented from passing from the bearings into the pool of pulp.

By maintaining a greater pressure of the bearing lubricant in space 51 in relation to the pressure in the pool outside of the bearings, the bearings and bearing lubricant may be sealed from the pool. The pressure of the bearing lubricant in space 51 forces the seals 48 against end plate 36. Bearing lubricant is forced between the springs 44 and provides a lubricant seal to prevent the lubricant from passing into the pool and to prevent liquid or solid matter from passing from the pool into the bearings. The seals 42 and 48 are conventional Garlock "Klozures" or similar seals. By facing the springs together, as in seal 48, there is formed a seal which will withstand for a substantial length of time the conditions under which it operates.

The double sealing member arrangement of the present invention is especially valuable where it is important to prevent contamination of the pool of pulp by lubricant from the bearing assembly of the shaft. Since such shafts operate in a pool of pulp which is abrasive and/or corrosive, the operating conditions are not conducive to long wear of the parts. To overcome in some measure the conditions of such operations, bearing lubricant is forced into conventional bearing assemblies under a high pressure in an attempt to prevent entrance of matter from the pool into the bearings. Conventional submerged bearing assemblies, however, are designed to allow the bearing lubricant to escape into the pool. Where the temperature of the pool is elevated, the escape of lubricant into the pool is more pronounced. With the device of the invention, bearing lubricant may be forced in between the two sealing members and vented beyond the pool to thereby prevent escape of bearing lubricant into the pool under conditions when conventional bearing assemblies would contaminate the pool. The flexible vent pipe provides means for the unhindered escape of the bearing lubricant from the space between the two sealing members to a point beyond the pool. Further, the vent provides means for opposing the pressure of the pool outside of the assembly to provide a positive seal between the bearing and the pool. The bearing lubricant may escape from the space 51 between the two seal members through the flexible vent pipe 58 to prevent bearing lubricant from escaping into and contaminating the pool. The device provides means for introducing bearing lubricant into the seals 42 and 48 and to maintain the lubricant under pressure in the seals and bearings. This pressure forces the sealing members into tight sealing relation between the two shafts providing a positive control which not only prevents the leaking or escape of lubricant into the pool but prevents ingress of grit and corrosive and abrasive material from the pool into the bearings.

While the invention has been illustrated by reference to a specific device, there is no intention to limit the invention to the precise details so illustrated except insofar as defined in the following claims.

We claim:

1. A bearing assembly for rotary mechanisms for submerged operation in a pool of liquid, a stationary support member, a rotary member telescoped with said stationary member, bearing means between said stationary and said rotary members, a first rotary seal mounted between said stationary and said rotary members arranged for maintaining said bearings out of contact with a liquid in which the assembly is submerged, a second rotary seal mounted between said stationary and said rotary members arranged for maintaining said first seal out of contact with a liquid in which the assembly is submerged, said second seal being spaced from and in proximity to said first seal so as to provide an annular space therebetween, and conduit means having an outlet beyond a pool in which the assembly is submerged interconnected with the space between said seals whereby bearing lubricant may escape from between said seals so as to prevent loss of lubricant into a submerging pool.

2. A bearing assembly for rotary mechanisms for submerged operation in a pool of liquid, a stationary support member, means for removably mounting said support in a submerging pool, a rotary member telescoped over said stationary member, bearing means mounted between said stationary and said rotary members so as to provide free rotation therebetween, a first non-metallic rotary seal mounted between said stationary and said rotary members arranged for maintaining said bearings out of contact with the liquid of a submerging pool, a second non-metallic rotary seal mounted between said stationary and said rotary members arranged for maintaining said first seal out of contact with the liquid of a submerging pool, said second seal being spaced from and in proximity to said first seal so as to provide an annular space therebetween, and conduit means extending from said annular space between said seals to a point beyond the liquid of a submerging pool whereby bearing lubricant may escape from between said seals to prevent loss of lubricant into a pool of liquid in which the assembly is submerged.

3. A bearing assembly for rotary mechanisms for submerged operation in a pool of liquid, a stationary support member, means arranged for removably mounting said support in a pool of liquid, a rotary member telescoped over and mounted for rotation on said stationary member, bearing means between said stationary and said rotary members, means extending through said rotary member for supplying lubricant under pressure to said bearing means, a first rotary seal mounted between said stationary and said rotary members arranged for maintaining said bearings out of contact with a pool of liquid in which the assembly is submerged, a second rotary seal mounted between said stationary and said rotary members arranged for maintaining said first seal out of contact with a pool of liquid in which the assembly is submerged, said second seal being spaced from and in proximity to said first seal so as to provide an annular space therebetween, and conduit means inclusive of passage in said stationary support member and a conduit interconnected therewith and extending to a point beyond a pool of liquid in which the assembly is submerged, said passage terminating in the space between said seals whereby bearing lubricant may escape from between said seals to prevent loss of lubricant into a submerging pool of liquid.

4. A bearing assembly for rotary mechanisms for submerged operation in a pool of liquid, a stub shaft arranged to be removably mounted in a submerging pool of liquid, a rotary main shaft telescoped over and mounted for rotation on said stub shaft, rotary bearings mounted between said shafts internal of said main shaft, a first seal mounted between said shafts substantially enclosing said bearings within said main shaft, a second seal mounted between said shafts enclosing said first seal within said main shaft so as to provide a space between said seals, and conduit means extending from a point beyond a submerging pool of liquid to said space between said seals whereby bearing lubricant may escape from between said seals to prevent loss of bearing lubricant into a submerging pool.

5. A bearing assembly for rotary mechanisms for submerged operation in a pool of liquid, a stationary stub shaft, a rotary, hollow shaft telescoped over and mounted for rotation on said stub shaft, rotary bearings mounted between said shafts internal of said hollow shaft, means extending through said hollow shaft for supplying lubricant under pressure to said bearings, a first non-metallic seal mounted between said shafts enclosing said bearings within said hollow shaft, a second non-metallic seal mounted between said shafts enclosing said first seal within said hollow shaft, said second seal being spaced from and in proximity to said first seal so as to provide a space between said seals, and conduit means extending from a point beyond said stub shaft to said space between said seals whereby bearing lubricant may escape from between said seals through said conduit means.

6. A bearing assembly for rotary mechanisms for submerged operation in a pool of liquid, a stationary stub shaft arranged to be removably mounted in a submerging pool, a rotary, hollow, main shaft telescoped over and mounted for rotation on said stub shaft, rotary bearings between said shafts internal of said main shaft, means extending through said hollow shaft for supplying lubricant to said bearings, a first cylindrical seal mounted on said stub shaft substantially enclosing said bearings within said main shaft, a second cylindrical seal mounted on said stub shaft substantially enclosing said first seal within said main shaft, said second seal being spaced from and in proximity to said first seal so as to provide a space therebetween, said seals being constructed and arranged for maintaining bearing lubricant under pressure therebetween, and conduit means inclusive of a passage in said stub shaft terminating in the space between said seals and an interconnected tube extending beyond said stub shaft whereby bearing lubricant may escape from between said seals to prevent loss of bearing lubricant into a submerging pool of liquid, said tube providing stand pipe means for maintaining the pressure of the lubricant in the bearing assembly greater than the fluid pressure of a submerging pool outside the bearing.

References Cited in the file of this patent

UNITED STATES PATENTS

| | | |
|---|---|---|
| 2,388,570 | Philips et al. | Nov. 6, 1945 |
| 2,546,538 | Erhardt | Mar. 27, 1951 |
| 2,580,529 | Dietz | Jan. 1, 1952 |
| 2,609,065 | Douglas | Sept. 2, 1952 |
| 2,641,518 | Trammell | June 9, 1953 |
| 2,688,520 | Covington | Sept. 7, 1954 |